No. 806,154. PATENTED DEC. 5, 1905.
N. LOMBARD.
RELIEF MECHANISM FOR WATER WHEEL CONDUITS.
APPLICATION FILED MAR. 2, 1903.

4 SHEETS—SHEET 1.

Witnesses:
Edna C. Cleveland,
Josiah E. Reid.

Inventor:
Nathaniel Lombard,
by Walter E. Lombard
Atty.

No. 806,154. PATENTED DEC. 5, 1905.
N. LOMBARD.
RELIEF MECHANISM FOR WATER WHEEL CONDUITS.
APPLICATION FILED MAR. 2, 1903.

4 SHEETS—SHEET 4.

Witnesses:
Edna C. Cleveland
Josiah E. Reid

Inventor:
Nathaniel Lombard,
by Walter E. Lombard
Atty.

UNITED STATES PATENT OFFICE.

NATHANIEL LOMBARD, OF BROOKLINE, MASSACHUSETTS, ASSIGNOR TO THE N. LOMBARD IMPROVED GOVERNOR COMPANY, OF WATERVILLE, MAINE, AND BOSTON, MASSACHUSETTS, A CORPORATION OF MAINE.

RELIEF MECHANISM FOR WATER-WHEEL CONDUITS.

No. 806,154. Specification of Letters Patent. Patented Dec. 5, 1905.

Application filed March 2, 1903. Serial No. 145,936.

*To all whom it may concern:*

Be it known that I, NATHANIEL LOMBARD, a citizen of the United States of America, and a resident of Brookline, in the county of Norfolk and State of Massachusetts, have invented certain new and useful Improvements in Relief Mechanism for Water-Wheel Conduits, of which the following is a specification.

This invention relates to relief mechanism for water-wheel conduits, and more particularly to those used in connection with water-wheels and like apparatus.

It has for its principal object the provision of means operable by the gate-controlling mechanism for caring for the inflowing water shut off by the closing of the gate, and thereby preventing an undue strain upon the mechanism.

It consists in certain novel features in construction and arrangement of parts, which will be readily understood by reference to the description of the drawings and to the claim hereinafter given.

Figure 1:
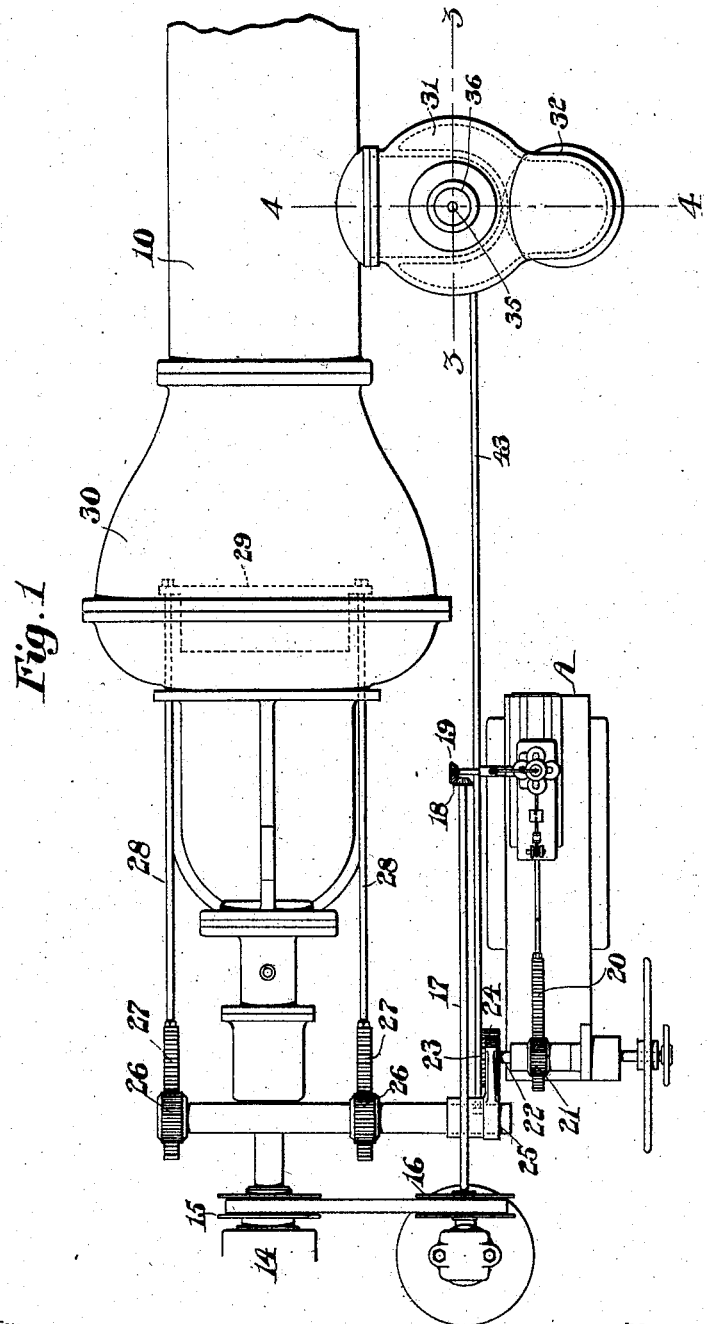
Figure 2:
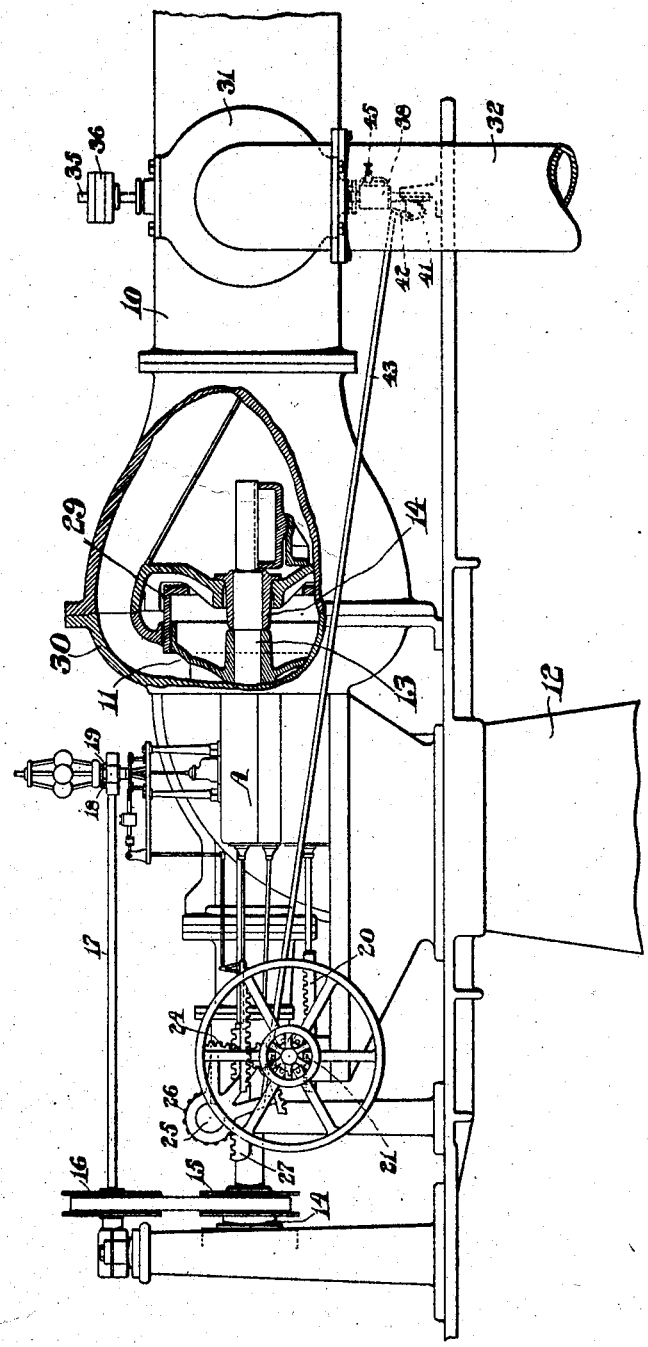
Figure 3:
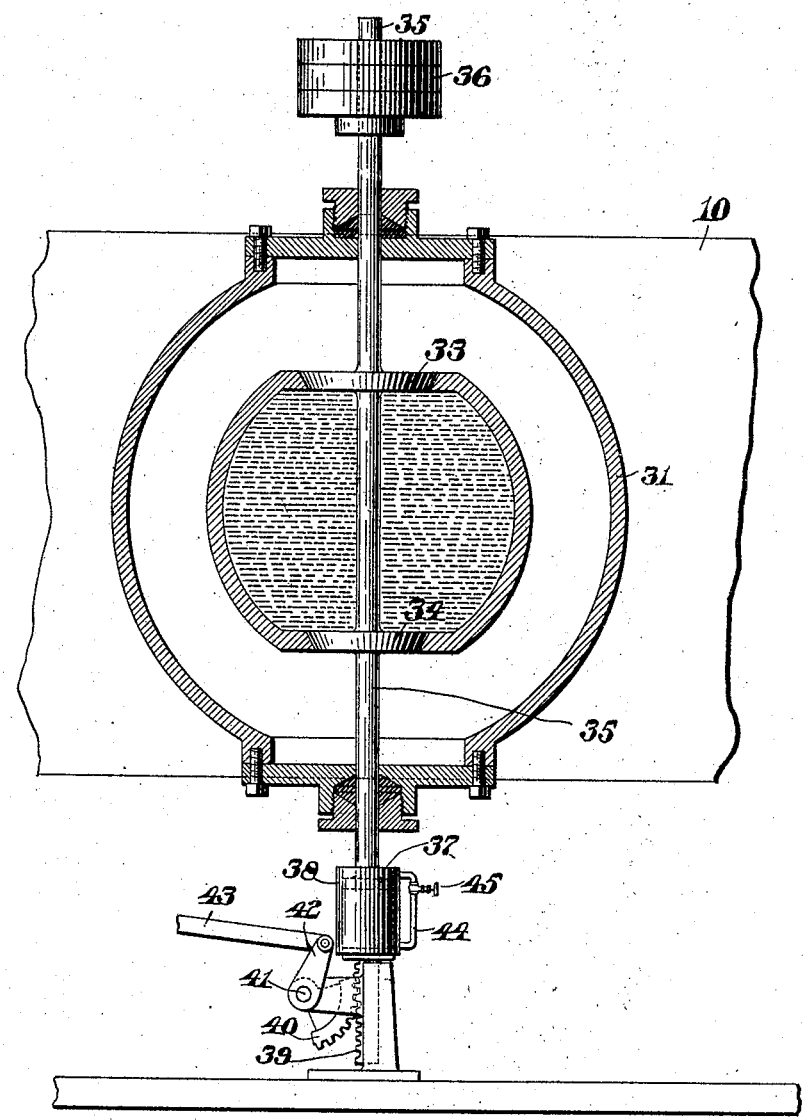
Figure 4:
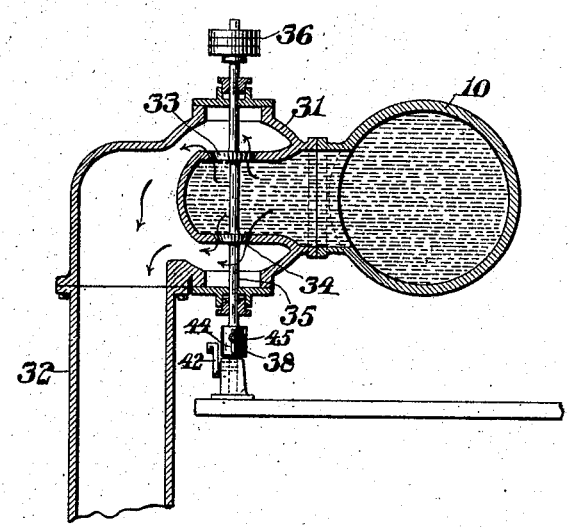
Figure 5:
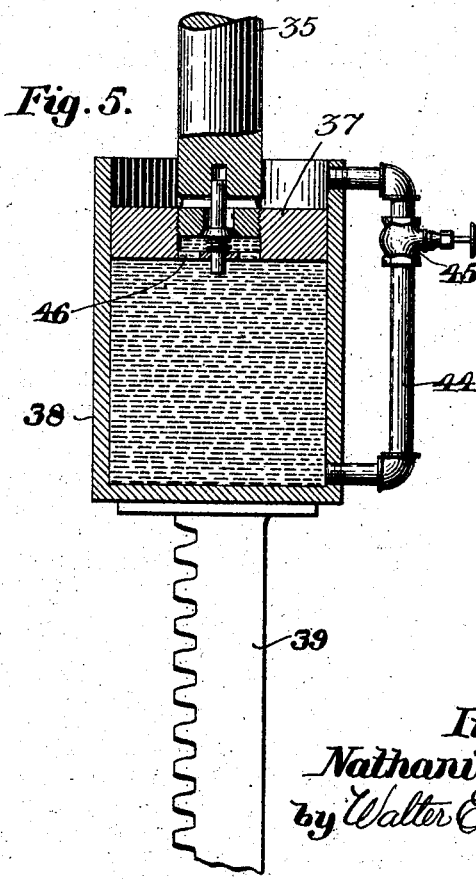

Of the drawings, Figure 1 represents a plan of an apparatus embodying the features of this invention. Fig. 2 represents a front elevation of the same, a portion of the inclosing casing being broken away to show the water-wheel. Fig. 3 represents an enlarged sectional elevation of a portion of the apparatus on line 3 3 on Fig. 1. Fig. 4 represents a sectional elevation on line 4 4 on Fig. 1; and Fig. 5 represents an enlarged sectional elevation of the lower end of the valve-stem, its piston, and inclosing casing.

Similar characters designate like parts throughout the several figures of the drawings.

In the drawings, 10 represents a flume for delivering water or other liquid to the water-wheel 11. The water after passing through the wheel 11 flows through the conduit 12 into the tail-race, (not shown,) all in a well-known manner. The water-wheel 11 is secured to a revoluble shaft 13, mounted in suitable bearings 14 and having secured thereon a pulley 15, belted to a pulley 16 on the shaft 17, which has secured thereon a gear 18, meshing with a gear 19 of a water-wheel governor A of any well-known construction. The governor A is provided with a reciprocating rack 20, engaging with a pinion 21, mounted on a shaft 22, on which is mounted a pinion 23, meshing with a gear-segment 24, secured to a shaft 25, having mounted thereon two pinions 26, meshing with racks 27, connected by rods 28 to the gate 29, which is adapted to be moved lengthwise in the enlarged portion 30 of the conduit to shut off the inflow of water or other liquid to the water-wheel.

Very often when the load is suddenly removed from the water-wheel and the governor acts to close the gate 29 suddenly the flow of water in the conduit 10 is so quickly stopped as to create a great strain upon the mechanism, and this is very objectionable. To obviate this, a valve-casing 31 is secured to the side of the conduit 10 and communicates therewith. The valve-casing 31 has an outlet into a pipe 32 leading into the tail-race or any other suitable receptacle. The casing 31 is provided with valves 33 34, mounted upon a valve-stem 35, the upper end of which is provided with suitable weights 36 and the lower end of which is provided with a piston 37, mounted in a cylinder 38, the opposite end of which is provided with a rack 39, meshing with a gear-segment 40, secured to a shaft 41, having mounted thereon a rocker-arm 42, connected by a rod 43 to the gear-segment 24. It will be readily seen by reference to the drawings that when the main governor A operates to move the gear-segment 24, so as to close the gate 29 and shut off the inflow of water to the water-wheel, the same movement will cause the segment 40 to operate to lift the valves 33 34 and allow the water to pass from the conduit 10 in the direction of the arrows shown in Fig. 4 into the pipe 32, leading to the tail-race. It is obvious that by this construction as soon as the governor acts to close the gate 29 the valves 33 34 will at the same time be raised to permit the pressure of water caused by the closing of the gate to be taken care of by diverting the inflow into the pipe 32 and thence to the tail-race. It is, however, desirable after the gate 29 has been closed and the inflow of water in the conduit 10 diverted into the pipe 32 to have the valves 33 34 gradually close, and thereby entirely stop the inflow of the water. This is provided for by filling the cylinder 38 beneath the piston 37 with oil, water, or other liquid and connecting the bottom of the cylinder by a by-pass 44 to the top of the cylinder, said by-pass being provided with a valve 45 for the purpose of regulating the amount of liquid that may flow through the by-pass 44.

When the valves 33 34 have been lifted to permit the passage of water from the conduit 10 to the pipe 32, the weight of the valve-stem and the weights 36 thereon is such as to cause the piston 37 to gradually move downward in the cylinder 38, forcing the liquid therein through the by-pass 44 into the top of the cylinder 38 until the valves 33 34 have again become seated and shut off the inflow of water through the same.

The weights 36 should be sufficiently heavy to prevent the valves 33 34 from being lifted from their seats by the pressure of the water in the conduit 10, as it is desired that this valve should remain closed at all times until operated upon by the main governor A. The valves 33 34 are so arranged that the pressure of water thereon practically balances them, there being only a slight excess in pressure upon them tending to cause them to open, this tendency being overcome by the weights 36. By this construction the necessity of bulky and heavy weights is entirely overcome, as is obvious.

The piston 37 having reached the bottom of the cylinder 38 and having pressed the liquid contained in said cylinder through the by-pass 44 to the top of the cylinder remains in this position until the governor again acts to open the gate 29, when the segment 40 will be operated to depress the cylinder 38, in the operation of which the liquid above the piston 37 is permitted to freely pass through the valve 46 into the bottom of said cylinder.

This arrangement of devices makes a very convenient means of controlling the inflow of water to the water-wheel and prevents any undue strain upon the various parts of the mechanism when the gate is suddenly closed, as often is the case, providing a ready means for diverting the water into another channel and then providing a means for gradually shutting off the inflow of water without any jar or strain upon the system.

It is believed that the invention will be readily understood without any further description.

Having thus described my invention, what I claim is—

In combination with a conduit and a pipe leading therefrom, a shaft projecting into said conduit and being provided at its inner end with a water-wheel, a gate for closing said conduit, racks connected to said gate, a shaft lying parallel to said last-named shaft, sheaves mounted on said shafts, a belt passing over said sheaves, a cross-shaft carrying pinions meshing with said racks, a governor, means whereby the governor is operated from said second-named or parallel shaft, a rack operated by the movement of the governor, a lateral shaft, a pinion mounted thereon and meshing with said last-named rack, another pinion carried by the last-named shaft, a toothed segment secured to said cross-shaft and meshing with the last-named pinion, a valve in said pipe, a valve-stem, the lower end of said valve-stem being provided with a piston and cylinder in which said piston works, a rack connected to said cylinder, a toothed segment meshing with said rack, a rocker-arm secured to said segment and a rod connected to said arm, and to the first-named segment.

Signed by me at Boston, Massachusetts, this 21st day of February, 1903.

NATHANIEL LOMBARD.

Witnesses:
WALTER E. LOMBARD,
EDNA C. CLEVELAND.